Jan. 2, 1968  R. D. WILKES  3,361,390
LOCKING DEVICE FOR AIRCRAFT LANDING GEAR
Filed April 6, 1966  4 Sheets-Sheet 1
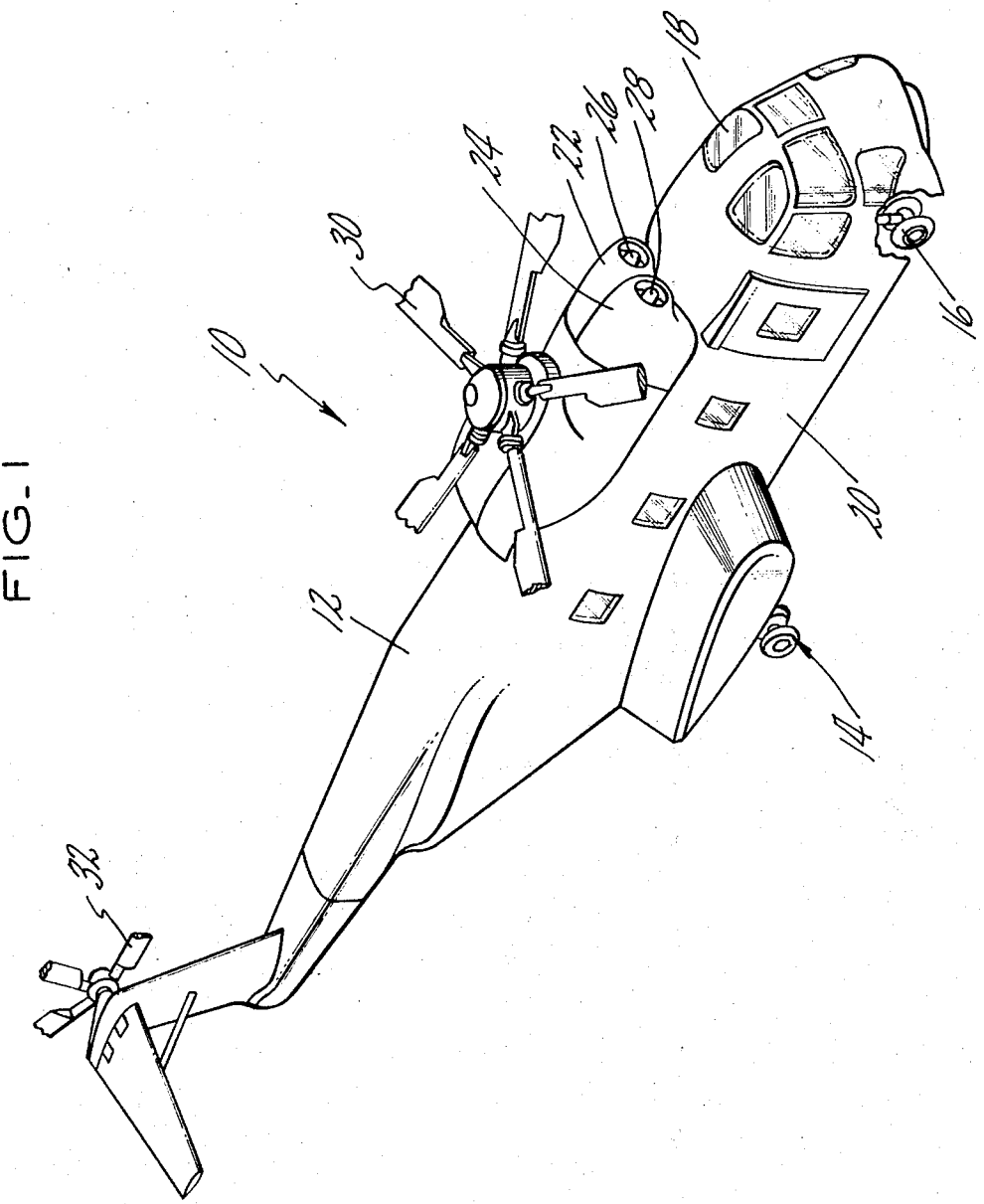
INVENTOR
RICHARD D. WILKES
BY *Vernon F. Hauschild*
ATTORNEY

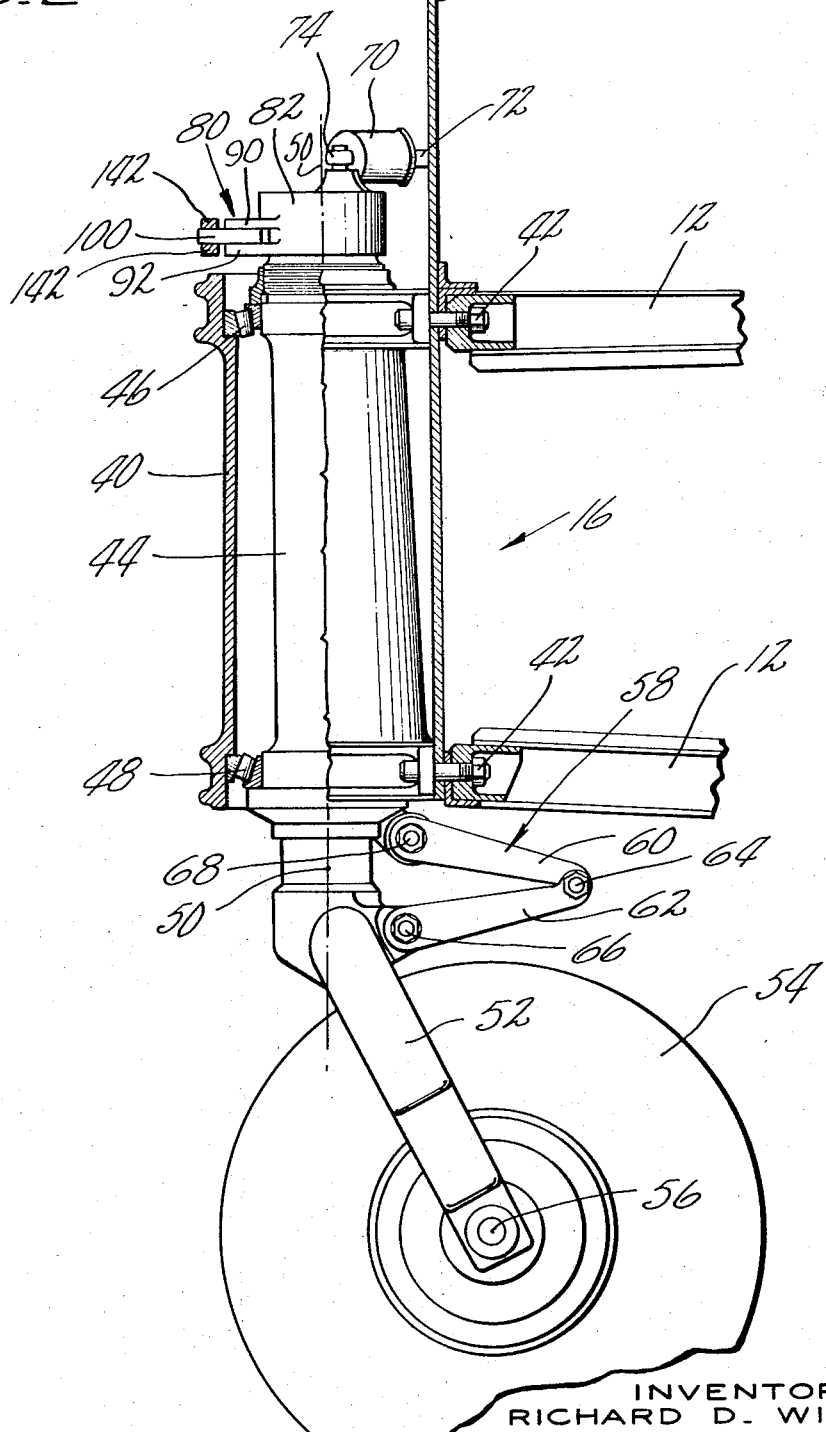

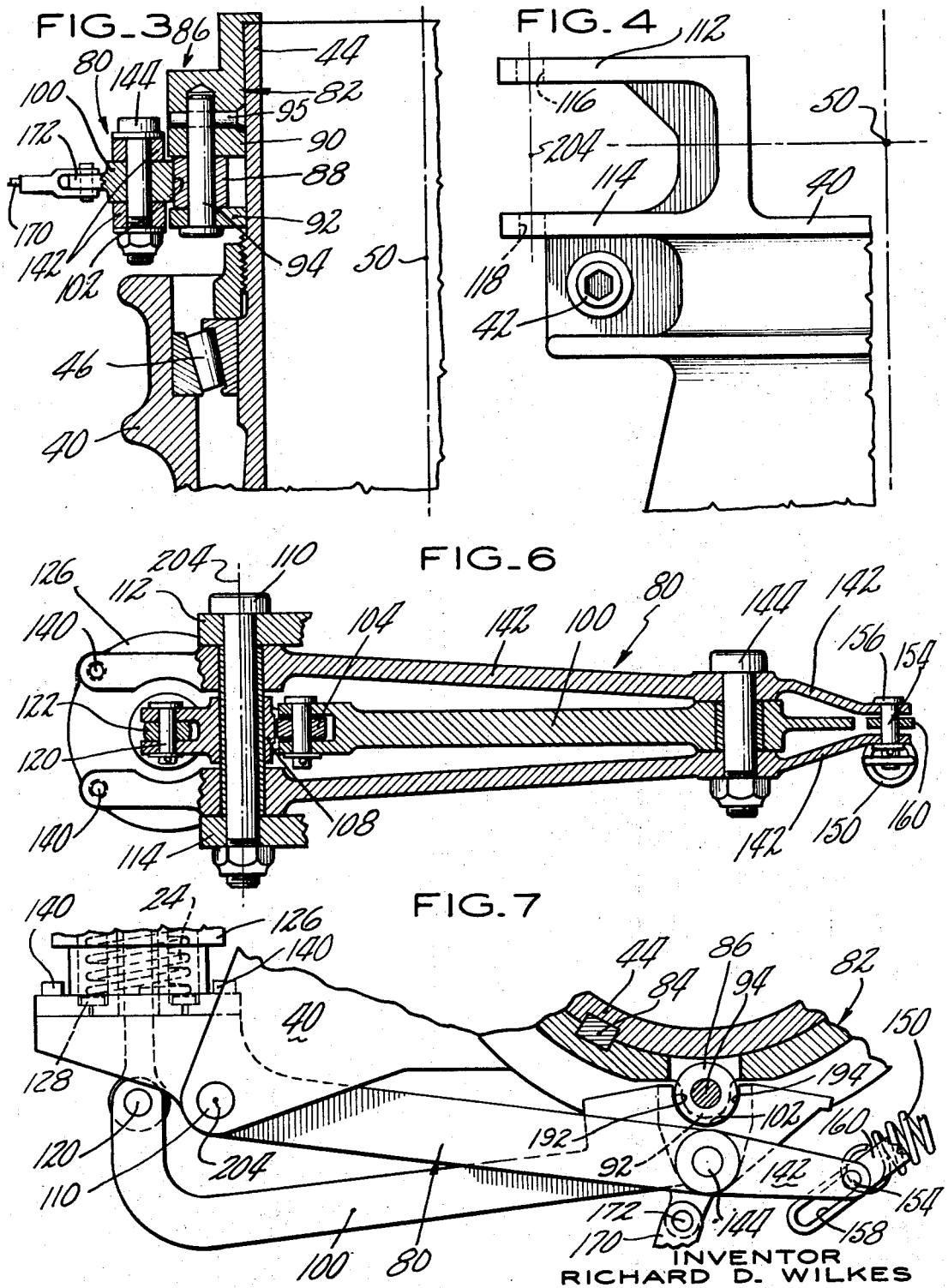

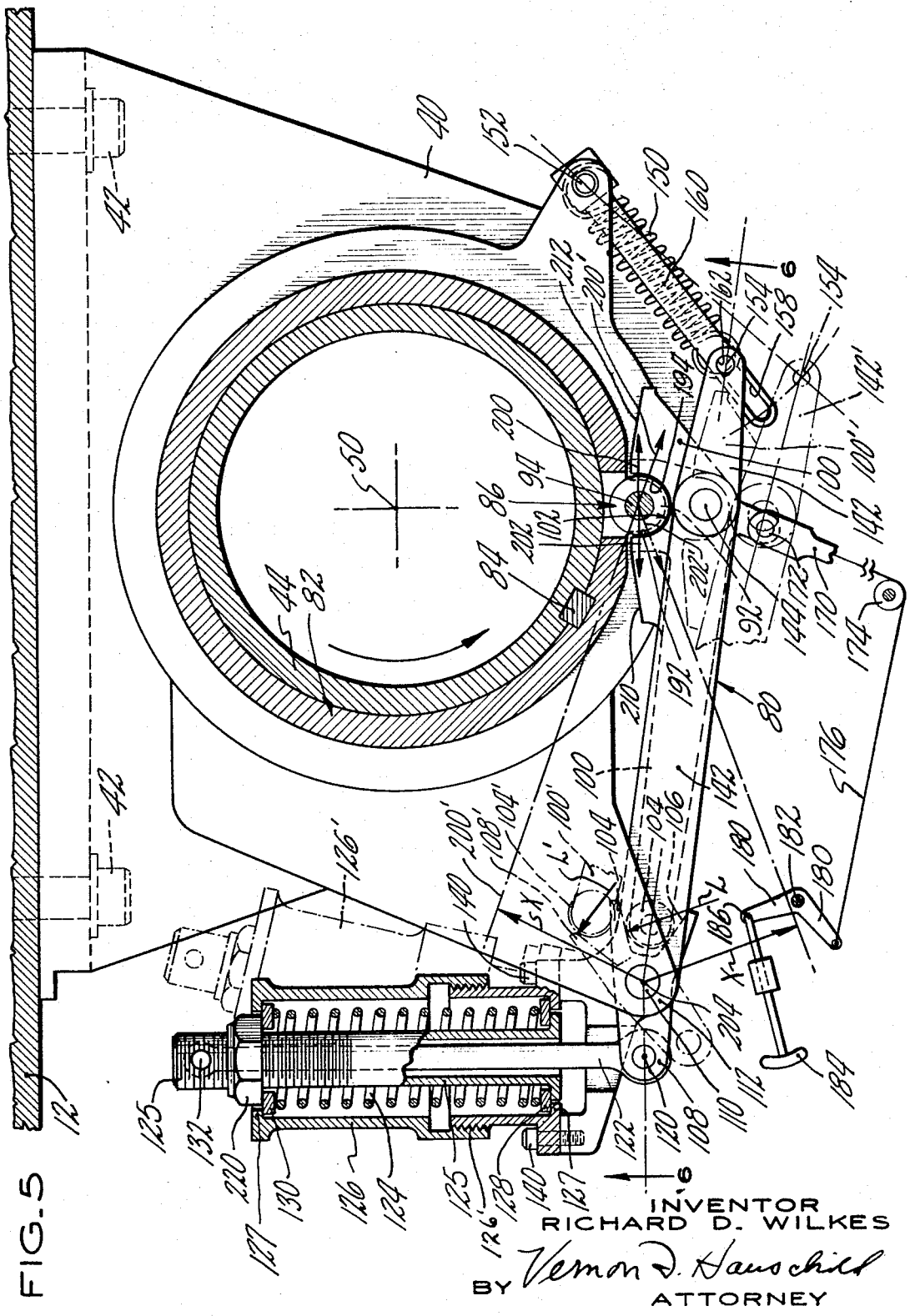

United States Patent Office 3,361,390
Patented Jan. 2, 1968

3,361,390
LOCKING DEVICE FOR AIRCRAFT
LANDING GEAR
Richard David Wilkes, Shelton, Conn., assignor to United
Aircraft Corporation, East Hartford, Conn., a corporation of Delaware
Filed Apr. 6, 1966, Ser. No. 540,724
19 Claims. (Cl. 244—50)

This invention relates to an aircraft landing gear and more particularly to a releasable lock mechanism for an air-craft wheel mounted for swivelling or castoring motion, such as the steering wheel of a tricycle landing gear.

In a tricycle landing gear system for an aircraft, it is desirable to lock the steering wheel against swivelling or castoring under certain conditions. For example, when the steering wheel is the tail wheel, it is desirable that the wheel be locked when the aircraft is parked as well as when the aircraft is landing or taking off. If the steering wheel is the nose wheel, it is desirable that it be locked while the aircraft is parked only.

To avoid damage to aircraft parts, it is highly desirable that the wheel lock be released whenever side, swiveling or castoring loads are applied thereto in excess of a predetermined force. This extreme wheel side loading could be caused by heavy wind conditions, or by maneuver motions of the aircraft which is towed or taxied while the wheel remains locked due to inadvertence.

In the past, shear pins have been used to perform this wheel locking function, however, shear pins have proven to be unsatisfactory because damage is often caused to aircraft parts prior to shear pin failure, and also because the replacement of a sheared shear pin frequently presents substantial problems. A typical shear pin wheel lock construction is shown in U.S. Patent No. 2,384,054. In addition, the shear pin construction presents the disadvantage that the landing wheel cannot be relocked until the sheared shear pin has been replaced.

It is an object of this invention to teach an anti-swivelling lock for the steering wheel of an aircraft, which lock will be released when the side, swivelling or castoring load on the locked wheel exceeds a predetermined limit, and which lock will automatically relock itself.

It is a further object of this invention to teach such an aircraft wheel lock, wherein the pilot may disengage the lock from the pilot compartment.

It is still a further object of this invention to teach such an aircraft wheel lock wherein substantial forced modification is experienced in the release mechanism as soon as the side loading on the locked wheel exceeds a predetermined limit, thereby effecting a quick release of the wheel and avoiding damage to aircraft parts.

It is a further object of this invention to teach a releasable antiswivelling lock for an aircraft landing gear wherein the lock mechanism is compact, wherein the lock mechanism includes a plurality of parts most of which are attached to fixed members in the aircraft and wherein the lock mechanism may be located in any area adjacent the support mechanism for the aircraft wheel and need not be positioned concentrically about the wheel support mechanism.

It is still a further object of this invention to teach a releasable lock mechanism for a swivelably-mounted aircraft wheel which includes a first member mounted for swivelling rotation with the wheel and having a projection extending circumferentially therefrom and a second and third member, each of which are pivotally connected to a fixed housing surrounding the wheel support mechanism and which are also pivotally connected to one another, and with one of said second or third members including a detent adapted to receive said projection and lock the wheel against swivelling, and also including a spring member extending between the second and third members to prevent relative rotation therebetween until the force of the spring member is overcome.

It is still a further object of this invention to teach such an antiswivelling wheel lock wherein the wheel is released for swivelling motion when the second and third members pivot relative to one another and further wherein the detent defining member includes cammed surfaces which are positioned to be contacted by the projection and to be moved out of position thereby until the projection and detent are realigned, whereupon a biasing spring will cause the detent to reengage the projection and thereby relock the wheel.

It is still a further object of this invention to teach such a releasable lock member and wherein the detent defining member is pivotally connected to or meshed with one end of an idler arm, which idler arm is pivotally connected between its ends to a fixed housing and is also pivotally connected at its other end to the spring means so that, as motion takes place between the idler arm and the detent defining member, the force on said spring is modified to quickly release the wheel lock member.

It is still a further object of this invention to teach such a releasable lock mechanism and wherein said detent includes cammed-side surfaces so contoured that as said projection bears against said side surface, the line of force therebetween passes through the pivotal connection between the housing and the second and third members and which cammed surface is contoured so that after initial pivotal action takes place between said second and third members, the line of force between the projection and the cammed surface is redirected to impose a projection releasing force on said second and third members.

Other objects and advantages will be apparent from the specification and claims and from the accompanying drawings which illustrate an embodiment of the invention.

FIGURE 1 is a showing of a modern aircraft utilizing tricycle landing gear and which is partially broken away to illustrate the position of the nose steering landing gear.

FIGURE 2 is a side showing of an aircraft landing gear mounted in the aircraft nacelle and including a simplified showing of my releasable antiswivelling lock mechanism, and which is shown partially in section for purposes of better illustration.

FIGURE 3 is an enlarged cross-sectional showing corresponding to the cross-sectional showing in the upper part of FIGURE 2 and which is included to show my releasable anti-swivelling lock in greater particularity.

FIGURE 4 is a showing of the fixed housing which is attached to the aircraft fuselage and which supports the landing wheel for swivelling action and which also supports the members of my releasable lock mechanism for pivotal motion thereabout.

FIGURE 5 is a top view of my release mechanism.

FIGURE 6 is a view of a portion of my release mechanism taken along line 6—6 of FIGURE 5.

FIGURE 7 is a modified showing of my wheel locking eliminating the idler arm.

Referring to FIGURE 1, we see modern aircraft 10 which includes fuselage 12 supported by tricycle landing gear system 14. Fuselage 12 is partially broken away to illustrate the location of the steering landing gear 16, which in the embodiment shown in FIGURE 1 is a nose wheel but could as well have been a tail wheel. Fuselage 12 defines pilot compartment 18 and passenger or cargo compartment 20 and serves to support the pods 22 and 24 which envelop engines 26 and 28. Engines 26 and 28 provide the power to drive lift rotor 30 and tail rotor 32, both of which are of conventional design but, for purposes of illustration, are shown with foreshortened blades. Aircraft 10 may be of the type more fully disclosed and described in U.S. Patent No. 2,925,130, to which reference may be made.

Referring to FIGURE 2, we see my swivelably-mounted landing gear 16 including cylindrical housing 40 which is fixedly attached to fuselage 12 by bolt means such as 42 and which receives and supports shaft or cylinder member 44 therewithin. Bearings 46 and 48 are supported by fixed housing 40 and engage shaft member 44 so that shaft member 44 is mounted in fixed housing 40 for swivelling motion about swivelling axis 50. Fork member 52 extends from shaft member 44 and supports aircraft wheel 54 for motion along the ground about the wheel rotating axis 56. Torque scissors 58 connect fork member 52 and wheel 54 to shaft member 44 so that these members are joined for swivelling or castoring action in unison about swivelling axis 50. Torque scissors 58 include link members 60 and 62 which are pivotally joined at pivot point 64, while link 62 is pivotally joined to fork member 52 at pivot point 66 and link 60 is pivotally joined to shaft member 44 at pivot point 68.

In conventional fashion, pressurized piston-cylinder unit 70 is pivotally connected to fuselage 12 at pivot point 72 and is pivotally connected to shaft member 44 at pivot point 74 and serves to bias wheel 54 to its fore-and-aft position.

Still viewing FIGURE 2, it will be noted that my automatically releasable and automatically reengageable, anti-swivelling lock mechanism 80 attaches to shaft member 44 and includes ring member 82.

Referring to FIGURES 3 and 5, we see that ring member 82 of my lock mechanism 80 encircles shaft member 44 and is attached for swivelling rotation therewith in any convenient fashion such as by key 84 (FIGURE 5). Ring member 82 has radial projection 86 extending therefrom, preferably in the form of a roller 88 mounted between flanges 90 and 92 of ring member 82 and through which a stub shaft 94, pinned at 95 (FIG. 3) to ring member 82, extends to permit roller 88 to rotate thereabout. It will be noted that since projection 86 is carried by ring member 82, which is in turn connected to shaft member 44, members 86, 82 and 44 will all rotate in swivelling motion with wheel 54 about swivelling axis 50. Link 100 (also shown in FIGURE 6) forms detent 102 at one end thereof, and detent 102 engages projection 86 to lock wheel 54. At its opposite end, link 100 carries roller 104 which engages in pivotal fashion the contoured cam surface 106 of force modifying idler arm 108. Idler arm 108 is pivotally connected to a fixed mechanism 110 between flanges 112 and 114 of fixed housing 40. The flanges include aligned holes 116 and 118 (FIGURE 4) to receive pivot shaft 110. As best shown in FIGURES 4 and 5, fixed housing 40 is attached to fuselage 12 through bolt units 42—42. As viewed in FIGURE 5, the left-hand end of idler arm 108 is pivotally connected at movable pivot connection 120 to one end of a connecting rod 122 that projects from the housing 126. The opposite end of the connecting rod 122 is pivotally attached at 132 to a spring retaining and adjusting member 125 so that the connecting rod 122 may pivot with respect to the housing assembly 126 about said pivot 132. Double-acting spring 124 is housed within housing 126 so as to position connecting rod 122 and its adjusting member 125. As shown, spring 124 is retained between washers 128 and 130 and is preloaded by the adjustment nut 220. Double-acting spring 124 and its associated members 128, 130, 220, 125 and connecting rod 122 is retained within this housing 126 by the inwardly projecting flanges 127—127 integral with the housing. Threaded connection 126' permits housing adjustment to coincide with spring and washer adjustments.

Spring housing 126 is connected through bolt mechanism 140 to link member 142. As best shown in FIGURES 5 and 6, link member 142 is pivotally connected to housing 40 about fixed pivot 110 so that link member 142 and motion reversing idler arm 108 are pivotally connected in alignment to fixed housing 40. Link member 142 is also pivotally connected to link member 100 by bolt means 144 so that relative pivotal motion is permitted between link means 100 and 142.

As best shown in FIGURE 5, biasing spring member 150 is pivotally connected to fixed housing 40 at pivot point 152 and is slidably connected to link member 142 at point 154 so that pivotal motion may take place between the parts. Connection 154 comprises bolt member 156 (FIGURE 6) passing through slot 158 in link 160, which forms part of biasing spring mechanism 150. End surface 162 of slot 158 serves as a positive stop with respect to the motion of links 142 and 100 toward projection 86.

Pilot-operated cable mechanism 170 is pivotally connected to link member 100 at pivot point 172 and extends around pulley 174, and connects to bell crank 180, which is pivotally connected to a fixed point in the aircraft at pivot point 182. Bell crank 180 pivotally connects to pilot-operated lock release lever 184 at pivot point 186. It will be noted that as the pilot depresses lever 184, cable mechanism 170 will pull link members 142 and 100 about pivot connection 110 away from ring member 82 so that detent 102 and projection 86 are disengaged, thereby freeing wheel 54 for swivelling motion. Conversely, as the pilot draws up on lock lever 184, cable 170 will be released and permit biasing spring mechanism 150 to cause links 142 and 100 to pivot about pivot connection 110 toward ring member 82 so as to bring detent 102 into engagement with projection 86 to thereby lock wheel 54 against swivelling.

Detent 102 is fabricated to have contoured side walls 192 and 194, against which projection 86 bears when a swivelling force is exerted against wheel 54 and while detent 102 is in its FIGURE 5 locked position. It should be noted that the line of force, whether as illustrated by vector arrow 202 or vector arrow 200, depending upon whether wheel 54 is attempting to swivel in a clockwise or a counterclockwise direction, passes through pivotal axis 204 of pivotal connection 110 so that no torque is exerted upon link 142 to move detent 102 out of engagement with projection 86. When link 100 pivots slightly about bolt means 144 with respect to link 142 against the restraining action of spring 124 and idler arm 108, the line of force between projection 86 and detent 102 is redirected as illustrated by vector line 200'. Idler arm 108 permits a substantial change in the redirection of vector 200 because it permits the length of arm 100 to be shorter than if it were connected directly to spring 124. The force operating along line 200' at a distance X (FIGURE 5) from pivotal axis 204 causes link 142 to pivot about axis 204. Link 142 will carry with it link 100 which will allow detent 100 and projection 86 to disengage. FIGURE 5 shows in phantom the links 100 and 142 in their unlocked positions, identified as 100' and 142', and wherein the wheel 54 is free for swivelling.

As shown in FIGURE 7, idler arm 108 could be eliminated and arm 100' could be connected to spring 24 and also pivotally connected to link 142 at pivot point 144. With this construction, however, you would not get the substantial redirecting of vector 200, and spring 24 would have to be softer to effect the same wheel release action.

It will also be noted that link 100 has cam repositioning surfaces 210 and 212 on opposite sides of detent 102. Surfaces 210 and 212 are contacted by projection 86 to move link 100 and link 142 toward their unlocked, phantom positions of FIGURE 5 as wheel 54 returns to its fore-and-aft position, and projection 86 approaches detent 102. When projection 86 is in alignment with detent 102, biasing spring unit 150 will move link 100 and link 142 to their locked or solid line FIGURE 5 positions thereby reengaging projection 86 and detent 102 to relock wheel 54 against swivelling.

Operation

Aircraft wheel 54 is locked against swivelling motion when projection 86 is engaged in recess 102 as shown in FIGURE 5. It is an important teaching of my invention that wheel 54 be locked against swivelling until the forces applied thereto to cause wheel swivelling motion approach value which could cause damage to wheel 54 or its associated mechanism. When this dangerous wheel swivelling force is approached, it is essential that my wheel lock 80 automatically release wheel 54 for swivelling, and that wheel lock 80 be automatically engaged after the wheel has returned to its fore-and-aft position. The operation of my wheel lock 80 will now be described so as to explain this automatic lock release and automatic relock function.

Assume that a side, swivelling or castoring load is imposed upon wheel 54 so as to swivel the wheel in a counterclockwise direction as illustrated by the arrow in FIGURE 5 while my lock 80 is engaged. Projection 86 will be forced against surface 194 of link 100, tending to pivot link 100 about bolt means 144. Link 100 will be restrained by idler arm 108 and double-acting spring 124 until the force of spring 124 has been overcome. Spring 124, which is double-acting in nature, is accordingly preloaded by adjustment nut 220 and housing 126 at adjusting joint 126' so as to be overcome before the wheel swivelling load approaches dangerous proportions. When the swivelling load applied by projection 86 to cam surface 194 of detent 102 overcomes the restraint of spring 124, link 100 will pivot slightly with respect to link 142 about bolt means 144 and, at the same time, due to the counterclockwise movement of roller 104 at the opposite end of link 100, idler arm 108 will pivot in a counterclockwise direction about pivot axis 204 to compress double-acting spring 124. This initial pivotal motion between links 100 and 142 will cause line of force 200 between projection 86 and detent 102 to shift to position 200', thereby applying an unlocking torque to link 142 to move link 142 and link 100 to their unlocked positions shown in phantom in FIGURE 5 so as to release projection 86 from detent 102 and free wheel 54 for swivelling. As wheels 54 returns to its fore-and-aft position, projection 86 will bear against either cam positioning surface 210 or 212 to cause link 100 and link 142 to pivot in a clockwise direction about pivot axis 204 until the projection 86 is centered. Projection 86 will then reengage detent 102 under the force of biasing spring 150. Wheel 54 is now relocked.

It will accordingly be seen that my wheel lock 80 both automatically releases when the wheel swivelling force reaches a preselected magnitude, and automatically relocks after the wheel has returned to its fore-and-aft position.

It will be evident that if the wheel swivelling force were applied so as to move projection 86 in a clockwise direction, projection 86 would bear against cammed surface 192 of detent 102. When the restraint of spring 124 is overcome, link 100 will pivot about bolt means 144 with respect to link 142 in a counterclockwise direction and thereby cause idler arm 108 to pivot about pivotal axis 204 in a clockwise direction to compress double-acting spring 124. This initial relative pivotal motion between link 100 and link 142 will cause the line of force between projection 86 and cam surface 192 to be redirected to force vector line 202' at a distance Y (FIGURE 5) from pivoting axis 204, thereby imposing a wheel unlocking torque to wheel lock 80 and free projection 86 from detent 102 to release wheel 54 for swivelling. As wheel 54 returns to its fore-and-aft position, projection 86 will bear against either cam surface 210 or 212 to pivot link 100 and link 142 in a clockwise direction about pivot axis 204 until the projection 86 is centered. Projection 86 and recess 102 will be realigned and reengaged due to the action of return spring 150. Wheel 54 is now relocked.

It is an important teaching of my antiswivelling wheel lock 80 that the swivelling force P imparted along vector lines 200 or 202 by projection 86 to detent 102 will be high to initially overcome spring 124, and hence to commence relative pivot motion between links 100 and 142, but that force P will reduce in magnitude yet still continue to move spring 124 after this initial relative rotation has taken place. This accordingly effects a quick release of lock 80 after the wheel swivelling force P exceeds the preselected limit illustrated in part by viewing FIGURE 5 and comparing the vectoring forces L and L' acting between roller 104 and cam surface 106 of idler arm 108 when the parts are in their locked positions shown in solid lines in FIGURE 5, as compared to the unlocked positions thereof shown in phantom at 104' and 108' in FIGURE 5.

It is to be understood that the invention is not limited to the specific embodiment herein illustrated and described but may be used in other ways without departure from its spirit as defined by the following claims.

I claim:
1. In an aircraft landing gear,
   (a) a fixed housing,
   (b) a shaft means supported by said housing for rotation about a swivelling axis and including first cooperating attachment means,
   (c) an aircraft wheel,
   (d) means connecting said shaft means to said wheel so that said shaft means and wheel will rotate in swivelling motion together about said swivelling axis,
   (e) first means pivotally connected to said housing and including second cooperating attachment means and adapted to be pivoted between a first position wherein said first and second attachment means cooperate to lock said shaft means with respect to said housing and hence lock said wheel against swivelling, and a second position wherein said first and second attachment means are separated to free said wheel for swivelling,
   (f) second means pivotally connected to said first means so that said first and second cooperating attachment means are separated as said first and second means pivot in relation to one another,
   (g) and spring means extending between said first and second means to prevent said first and second means from pivoting relative to one another until the force of said spring means is overcome.

2. Apparatus according to claim 1 wherein said first means includes a first link member which is pivotally connected to said second means and a force varying idler arm which is pivotally connected between its opposite ends to said housing and which is also pivotally connected at one end to said spring means and which is also connected at the other end to said link member so that said link member and said idler arm may pivot relative to one another and thereby vary the force imposed upon said spring means as said first and second means pivot relative to one another.

3. Apparatus according to claim 2 and wherein said first cooperating attachment means is a projection extending from said shaft means and wherein said second cooperating attachment means is a detent adapted to receive said projection so as to lock said wheel against swivelling when said projection and detent are in engagement and so as to free said wheel for swivelling when said projection and said detent are out of engagement.

4. Apparatus according to claim 3 and wherein said first and second means are pivotally connected adjacent said detent so that as said shaft means attempts to swivel when said projection and detent are in engagement, said projection bears against said detent to cause said first and second members to pivot relative to one another after the force of said spring means has been overcome to thereby free said projection from said detent to free said wheel for swivelling.

5. Apparatus according to claim 4 wherein said idler arm includes a cammed surface at one end thereof and wherein said link member includes a roller bearing against said cammed surface to effect the pivotal connection between the idler arm and the link member and wherein said cammed surface is contoured so that as said projection bears against said detent to cause pivotal motion between said first and second means, pivotal motion will also occur between said idler arm and said link member to reduce the force acting on said spring means.

6. Apparatus in accordance with claim 5 and including manually operable means to move said first means between said first and second positions.

7. Apparatus according to claim 6 and including means to bias said first means toward said first position.

8. Apparatus according to claim 7 and including positive stop means to limit the travel of said first means toward said shaft means.

9. Apparatus according to claim 8 and including means to adjustably vary the loading of said spring means.

10. Apparatus according to claim 5 wherein the pivotal connection between said second means and said housing and said first means and said housing are in alignment and further wherein the line of force between said projection and said detent, when said first means is in said first position and said wheel attempts to swivel, is in alignment with said pivotal connection between said first and second means and said housing.

11. Apparatus according to claim 10 wherein said detent includes cammed side surfaces against which said projection forcibly bears when said first means is in said first position and swivelling torque is applied to said wheel and which detent cammed surfaces are so contoured that when the force of said projection bearing against said cammed surface of said recess is sufficient to overcome the force of said spring means, said first means will pivot with respect to said second means thereby repositioning said detent cammed surface so that the line of force between said projection and said detent cammed surface will be redirected to apply a torque to said second means in a direction to move said first and said second means away from said projection to thereby free said wheel for swivelling.

12. Apparatus according to claim 7 wherein said first means includes relocking cammed surfaces against which said projection will bear as said wheel swivels and thereby move said first means toward said second position so that said projection may be aligned with said detent and so that said projection may be engaged in said detent when said biasing means returns said first means to said first position.

13. An aircraft including a fuselage,
(a) a housing fixed to said fuselage,
(b) a shaft means supported by said housing for rotation about a swivelling axis and including first cooperating attachment means,
(c) an aircraft wheel,
(d) means connecting said shaft means to said wheel so that said shaft means and wheel will rotate in swivelling motion together about said swivelling axis,
(e) a first means pivotally connected to said housing and including second cooperating attachment means and adapted to be pivoted between a first position wherein said first and second attachment means cooperate to lock said shaft means with respect to said housing and hence lock said wheel against swivelling, and a second position wherein said first and second attachment means are separated to free said wheel for swivelling,
(f) a second means pivotally connected to said first means so that said first and second cooperating attachment means are separated as said first and second means pivot in relation to each other,
(g) and spring means extending between said first and second means to prevent said first and second means from pivoting relative to each other until the force of said spring means is overcome.

14. In an aircraft landing gear,
(a) a fixed housing,
(b) a shaft means supported by said housing for rotation about a swivelling axis,
(c) a ring member attached to said shaft means for rotation therewith about said swivelling axis and having a first cooperating attachment means,
(d) an aircraft wheel,
(e) means connecting said shaft means to said wheel so that said shaft means, said ring member and said wheel will rotate in swivelling motion together about said swivelling axis,
(f) a first means pivotally connected to said housing and including second cooperating attachment means and adapted to be pivoted between a first position wherein said first and second attachment means cooperate to lock said ring member and shaft means with respect to said housing and hence lock said wheel against swivelling, and a second position wherein said first and second attachment means are separated to free said wheel for swivelling,
(g) a second means pivotally connected to said housing and to said first means so that said first and second cooperating attachment means are separated as said first and second means pivot in relation to each other,
(h) and spring means extending between said first and second means to prevent said first and second means from pivoting relative to each other until the force of said spring means is overcome.

15. In an aircraft landing gear,
(a) a fixed housing,
(b) a shaft means supported by said housing for rotation about a castoring axis and including a projection extending therefrom,
(c) an aircraft wheel,
(d) means connecting said shaft means to said wheel so that said shaft means and wheel will rotate in castoring motion together about said castoring axis,
(e) first linkage means having a first end including a selectively contoured detent adapted to engage said projection and also including cammed face surfaces on opposite sides of said detent, and also including a second end,
(f) second linkage means having a first end and a second end,
(g) means pivotally connecting said first ends of said first and second linkage means adjacent said detent,
(h) means pivotally connecting said second ends of said first and second linkage means in alignment to said housing at a location spaced from said detent a distance substantially greater than the distance between said detent and said first pivotal connection means,
(i) spring positioning means positioned between said second ends of said first and second linkage means to prevent pivotal motion therebetween about said first pivot connection until the force of said spring means has been overcome,
(j) said detent being selectively contoured so that as said projection bears against said detent as a castoring torque is applied to said wheel the line of force between said projection and said detent will pass through said second pivotal connection means and, so that when the castoring torque exceeds the positioning force of said spring means, said first linkage means will pivot about said first pivotal connection with respect to said second linkage means so that the line of force between said projection and said contoured detent is redirected to establish a torque which will cause said first and said second linkage means to pivot about said second pivotal connection to free said projection from said detent and thereby free said wheel for castoring.

16. Apparatus according to claim 15 and including means biasing said detent of said first linkage means toward said projection and wherein said first linkage means includes cammed positioning surfaces on opposite sides of said detent so that as said freed projection approaches the fore-and-aft position of said wheel, said projection will bear against said one of said cammed surfaces to overcome said biasing means and move said first linkage means away from said projection until said projection is in alignment with said detent, whereupon said biasing means will return said detent into engagement with said projection thereby relocking said wheel against castoring.

17. Apparatus according to claim 16 and wherein said first linkage means is of multipiece construction including a first linkage member defining said detent and cammed surfaces and being pivotally connected to said second linkage means at said first pivotal connection, and also including a force altering idler arm pivotally connected between its ends to said second linkage means at said second pivotal connection and having one end pivotally connected to said spring means and a second end defining a contoured cammed surface connected to the second end of said first linkage member to permit relative pivotal motion therebetween and with said cammed surface being contoured so that as said first linkage member and said idler arm pivot relative to one another, the force imparted to said spring means is altered.

18. In an aircraft wheel mounted for castoring motion, a fixed housing, a lock to prevent wheel castoring comprising a first member mounted in said fixed housing to pivot with said wheel in castoring motion and having a projection extending therefrom, detent defining means pivotally connected to said housing for movement between a first position wherein said projection is located in said detent means to lock said projection in position so that said first member and said wheel are locked to prevent castoring motion and a second position wherein said projection is free of said detent means so that said first member and said wheel are free to move in castoring motion, a second member external of said housing and pivotally connected to said housing and to said detent defining means, and spring means extending between and connected to said detent defining means and said second member so that when said detent means is in said first position and a wheel castoring force is applied sufficient to overcome the positioning force of said spring means, said detent defining means will pivot relative to said second member to free said projection from said detent defining means and thereby free said wheel for castoring.

19. In an aircraft wheel mounted for castoring motion, a fixed housing, a lock to prevent wheel castoring comprising a first member mounted in said fixed housing to pivot with said wheel in castoring motion and having a projection extending therefrom, detent defining means supported for movement between a first position wherein said projection is located in said detent means to lock said projection in position so that said first member and said wheel are locked to prevent castoring motion and a second position wherein said projection is free of said detent means so that said first member and said wheel are free to move in castoring motion, a second member external of said housing and pivotally connected to said housing and to said detent defining means, and spring means extending between and connected to said detent defining means and said second member so that when said detent means is in said first position and a wheel castoring force is applied sufficient to overcome the positioning force of said spring means, said detent defining means will pivot relative to said second member to free said projection from said detent defining means and thereby free said wheel for castoring.

References Cited
UNITED STATES PATENTS

| | | | |
|---|---|---|---|
| 2,560,726 | 7/1951 | Jones et al. | 16—35 X |
| 2,583,858 | 1/1952 | Kostolecki | 16—35 |
| 3,006,579 | 10/1921 | Frederick | 244—50 |

MILTON BUCHLER, *Primary Examiner.*

B. BELKIN, *Assistant Examiner.*